Sept. 15, 1964 K. F. LEACH 3,148,795
COACH BODY JACK
Filed Nov. 15, 1962 2 Sheets-Sheet 1

INVENTOR.
KANT F. LEACH
BY
ATTORNEY

Sept. 15, 1964  K. F. LEACH  3,148,795
COACH BODY JACK
Filed Nov. 15, 1962  2 Sheets-Sheet 2

INVENTOR.
KANT F. LEACH
BY
ATTORNEY

United States Patent Office 3,148,795
Patented Sept. 15, 1964

3,148,795
COACH BODY JACK
Kant F. Leach, 4395 S. Galapago St., Englewood, Calif.
Filed Nov. 15, 1962, Ser. No. 237,941
5 Claims. (Cl. 214—515)

This invention relates to vehicular equipment extensively in use in a wide diversity of structural detail that is typically distinguished by the separable association with an open-bed automotive unit, such as a "pick-up" truck, of a closed coach body, or so-called "camper," in an operative interrelation accommodating, at option, translation of the coach body in combination with the automotive unit and removal of the coach body to free the automotive unit for other uses to which it is adapted, and has as an object to provide novel and improved means for facilitating removal and replacement of the coach body relative to the automotive unit.

A further object of the invention is to provide novel and improved means operable as a jack in direct reaction to powered travel of an open-bed automotive unit to separably elevate and alternatively to coactively lower a coach body relative to the bed of the unit.

A further object of the invention is to provide novel and improved jack means adapted in attachment to a conventional coach body coactable with an open-bed automotive unit to apply powered travel of the unit for removal and replacement of the body relative thereto.

A further object of the invention is to provide novel and improved jack means effective through powered travel of an open-bed automotive unit to facilitate removal and replacement of a coach body coactable with the unit bed, which means are characterized by ready operative adaptability to conventional bodies and units of diverse size and particular construction.

A further object of the invention is to provide jack means of the character described which are feasible of either fixed or separable association with a coach body reactive thereto.

A further object of the invention is to provide jack means of the character described which provide secure and stable support in use condition for an associated coach body thereby elevated away from coaction with the bed of an automotive unit.

A further object of the invention is to provide jack means of the character described which are inexpensive of production from readily-available materials, light in weight, convenient of simple operative manipulation, easily applicable for intended use with conventional coach body and automotive unit equipment without modification or impairment of the latter, and positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawings, in which FIGURE 1 is a somewhat diagrammatic side elevational view of a conventional coach body and automotive unit combination equipped with the improvement of the invention arranged, as shown by full lines, to function with elevating effect upon the coach body and, alternatively, as shown by broken lines, for translation with the combination, a forward portion of the automotive unit immaterial to an understanding of the invention being broken away to conserve space.

Figure 1:
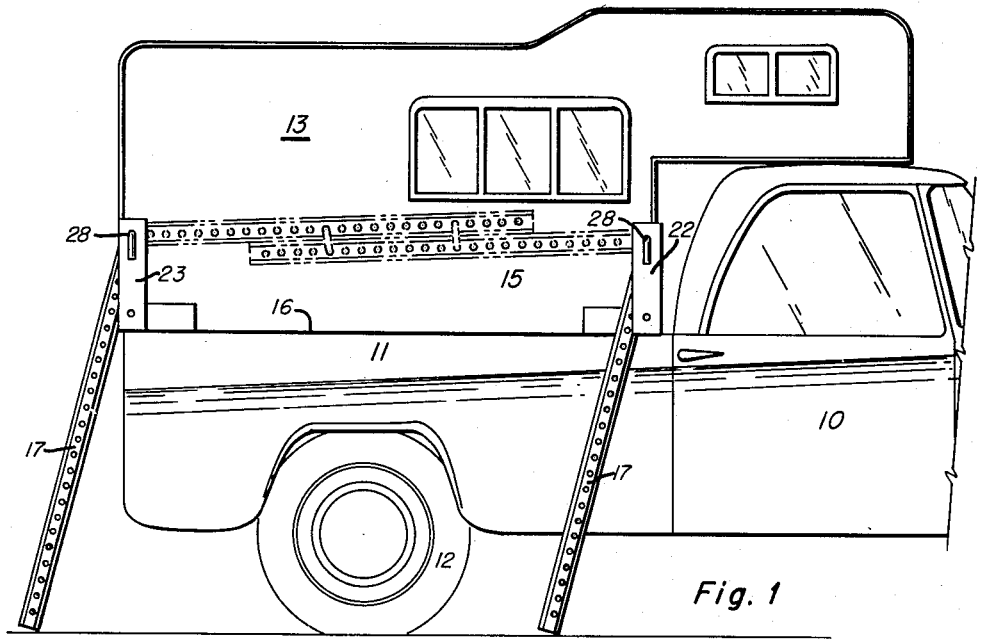
Figures 2, 3:
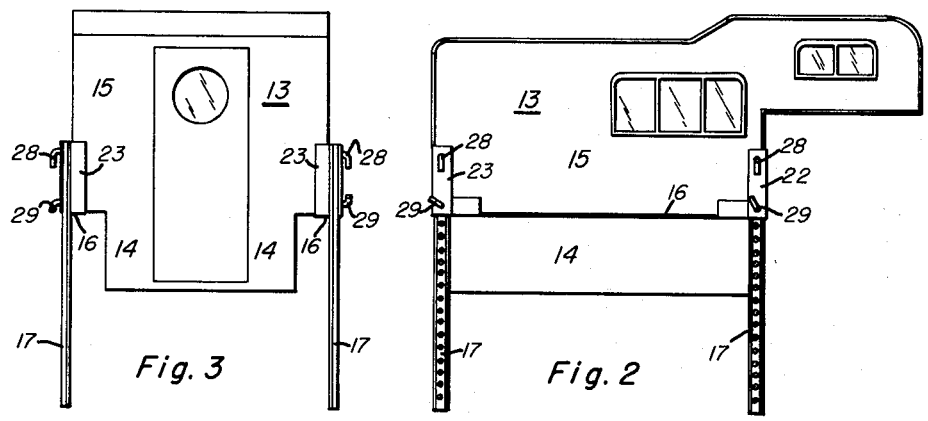
FIGURE 2 is a side elevational view, on a relatively-reduced scale, of the coach body component represented in FIGURE 1 as supported in separation from the automotive unit by the jack means of the invention.
FIGURE 3 is a rear end elevational view of the arrangements exemplified by FIGURE 2.

In a wide variety of makes, sizes, and structural particularity there is conventionally available a category of automotive vehicles identified generally as "pick-up" trucks alike characterized by a cab 10 forward of an open-top bed 11 carried above traction wheels 12. The bed 11 is commonly formed with a flat floor closing between upstanding, parallel side walls and a fixed, transverse, forward end wall coplanar at their upper margins, and a tail-gate hinged to the rearward end of the floor cooperates with the rearward ends of the side walls as an optionally-available closure for the end of the bed remote from the cab. Obviously of pronounced and diverse utility, conventional "pick-up" trucks are extensively utilized as vehicular components of mobile housing, and the equivalent, through the separable association therewith of integrated coach body units 13 conventionally available in adaptations proportioned for coaction with particular beds 11. Diverse in many particulars, the conventional coach bodies 13 appropriate for coaction with "pick-up" trucks have in common a lower body enclosure portion 14 sized to rest upon the floor of a bed 11 in accommodation between the side walls and abutment against the forward end wall thereof and an upper body enclosure portion 15 wider than the associated portion 14 arranged to extend at each side laterally beyond and over the upper side wall margins of the bed accommodating the portion 14 in an arrangement establishing laterally-salient angles 16 overhanging and clearing subjacent elements of the truck longitudinally of the bed. In a length such as to extend rearwardly of the bed 11 beyond the tail-gate or to be confined thereby, the typical coach body 13 is manipulable as a unit into seated engagement within, and appropriate attachment to, the bed 11 to function as a housing enclosure translatable with and by the associated vehicle, all with provision for separation of the body 13 from the bed, as occasion may warrant, to free the vehicle for such other uses as may thereto appertain. The structures, organizations, and correlations just above described are, being conventional, in and of themselves no part of the instant invention, and are herein set forth merely to establish the locus and operative environment of the novel and improved jack means employable to facilitate removal and replacement of a typical coach body 13 relative to a typical "pick-up" truck bed 11, as hereinafter explained.

Figure 4:
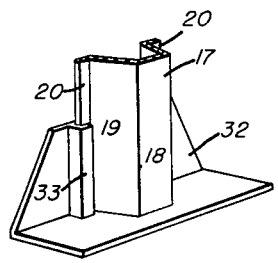
FIGURE 4 is a fragmentary, detail, perspective view, on a relatively-enlarged scale, of a typical bearing shoe adjunct useful within the contemplation of the invention as an optional supplement to the improved jack means.

The purposes of the invention are realized in accordance with the concept thereof through the agency of four like, straight, rigid struts, or legs, 17 individually connected exteriorly to and to swing in vertical arcs longitudinally of the coach body 13 from attachments adjacent the four principal vertical corners of the body. Significant to the economy and practicality of the improvement is the ready availability of strong, light-weight material suitable when merely cut to desired lengths for the production of the struts 17, such material having the form, as best shown by FIGURE 4, of a straight length of steel channeled in transverse section to present a flat longitudinal fillet 18 symmetrically conjoined by means of divergent flat longitudinal webs 19 with spacedly-coplanar, outwardly-directed longitudinal flanges 20 paralleling the fillet 18, a further expedient feature of the available material being a symmetrically-spaced succession of like holes 21 longitudinally of said fillet.

Figure 5:
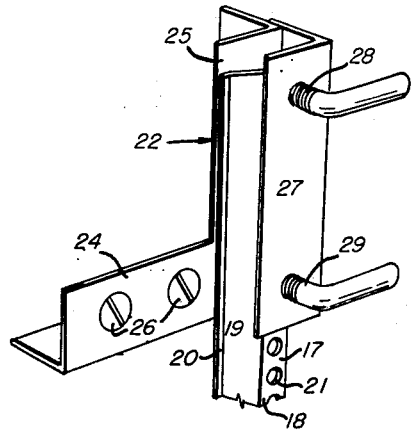
FIGURE 5 is a fragmentary, detail, perspective view, on approximately the same scale as FIGURE 4, of the bracket and strut correlation appearing at the right in FIGURE 2 as disassociated from the coach body, a portion of the strut being broken away to conserve space.

Operative connection of the four struts 17 to the coach body with provision for desired adaptations and adjustments is facilitated by the presence of the laterally-salient angles 16 typical of conventional such bodies and such connection is had through the provision of functionally-analogous, specifically-different brackets 22 and 23 adapted to cover in engagement over and to be secured to the corners of the coach body resulting from intersection of said angles 16 with the forward and rear end closure, respectively, of the body structure, which corners are usually right-angular as marking the conjunction of perpendicularly-related vertical and horizontal planes. The brackets 22 coactable with the forward salient corners of the coach body 13 are mirror counterparts distinguished only in their adaptation to mounting at the right and left hand sides of the enclosure and are exemplified as to organization by the showing of FIGURE 5, a description whereof should suffice for an understanding of the counterpart. Referring to FIGURE 5, an angle plate comprised of a right-angular runner 24 and a fixedly- and perpendicularly-related riser 25 is shaped to comfortably embrace and overlie the intersecting horizontal and vertical corners resulting from intersection of the salient angles 16 with the forward end enclosure of the coach body and to be firmly attached, as by means of fasteners 26, to the body elements so embraced. Fixed in secure attachment to the riser 25, a right-angular keeper 27 is disposed with one of its legs parallel to and offset outwardly from the adjacent upright web of the riser, whereby to define a pocket open at the upper and lower ends, closed at the side substantially paralleling the forward end closure of the coach body, and open at the side directed rearwardly of the coach body and adapted to loosely house a corresponding length portion of a strut 17. Registered holes perpendicularly intersecting the keeper 27 and adjacent face of the riser adjacent the upper ends thereof detachably mount, as by threaded coaction, or otherwise, a pivot pin 28 thereby positioned to engage through one of the holes 21 in the fillet 18 of the strut length received in the pocket defined by the keeper, whereby to detachably and adjustably connect the strut to the bracket 22 for limited oscillation in a vertical arc about the axis of the pin 28 between a forward vertical position determined by the closed side of the keeper pocket and angular deviations rearwardly therefrom. Significant to the purposes of the invention, provision is made in any expedient manner for latching the strut 17 in its forwardly-limited, vertically-positioned relation with the associated bracket, a practical arrangement for so doing being illustrated as a latch pin 29, conveniently identical with the pivot pin 28, removably and replaceably coactable with registered holes in and adjacent the lower ends of the keeper 27 and opposed face of the riser in a spacing from the pivot pin holes correlated with the spacing of the strut holes 21, whereby said latch pin 29 is adapted to engage through one of the strut holes 21 and immobilize the strut when the latter is at the forward limit of its oscillation about its pivot pin support.

Figure 6:
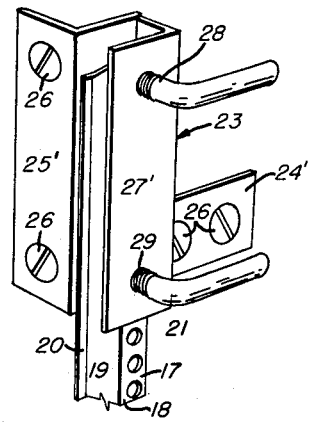
FIGURE 6 is a view similar to FIGURE 5 showing the bracket and strut correlation appearing at the left in FIGURE 2 as disassociated from the coach body.

The brackets 23, also, are mirror counterparts distinguished only in their adaptation to mounting at the right and left hand sides of the rear end of the coach body enclosure and are exemplified as to organization by the showing of FIGURE 6, wherein appears an angle plate comprised from a right-angular runner 24' and a fixedly- and perpendicularly-related riser 25' adapted to overlie and comfortably embrace rearward salient corners of the coach body in attachment thereto by means of fasteners 26 in the manner and to effect the cooperations above set forth at the rearward end of the coach body. In functional equivalence with the brackets 22, each bracket 23 includes a keeper 27' secured thereto with one of its legs offset outwardly from and parallel to the opposed face of the riser 25' as the outer wall of a pocket closed at its forwardly-directed side, open at both ends and the rearwardly-directed side, and adapted to loosely house a length portion of a strut 17 detachably, adjustably, and swingably associated therewith by means of a pivot pin 28 and supplementing latch pin 29 as previously described, whereby the struts 17 mounted by means of the brackets 22 and 23 at the four salient corners of the coach body are arranged to swing individually and in parallel to and rearwardly away from vertical disposition and to be individually latched in vertical parallelism.

As should be adequately apparent, the above-described provision for associating the struts 17 with the coach body 13 accommodates optional detachment of the struts for storage and transportation separate from the coach body, is amenable, through slight and obvious modification of the brackets 23, to permit inoperative disposition of the struts in maintained attachment to their brackets against and along the side walls of the coach body, as represented by broken lines in FIGURE 1, and facilitates length adjustment of the individual struts with respect to their pivot pins.

Figure 8:
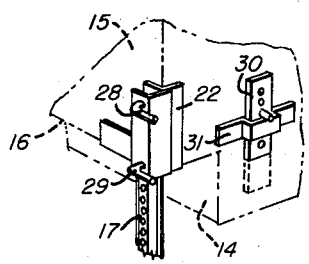
FIGURE 8 is a fragmentary perspective view of a forward corner of the coach body in the supported arrangement according to FIGURES 2 and 3 as furnished with typical, optionally-adjustable latch means effective, within the contemplation of the invention, to facilitate replacement of the coach body in coaction with the bed of the automotive unit.

It being desired to separate a coach body 13 equipped with the brackets 22 and 23 from its seat in and transportable association with a truck bed 11, the use and operation of the improved jack is simple and reasonably obvious. With the vehicle at rest where it is intended to locate the separated coach body, a strut 17 is pivoted engagement with each of the brackets by means of its pin 28 is manipulated and adjusted as to length relative to the pivot pin to engage at its free end with the ground, or vehicle support surface, at an inclination to the vertical resulting from a like displacement of the lower ends of all four struts rearwardly of the vehicle with respect to their pivots, whereafter, any connections between the coach body 13 and bed 11 having been released, powered rearward travel of the vehicle applies the leverage of the inclined struts 17 to elevate the body relative to the bed as the thrust of the bed forward end wall against the body portion 14 acts to move the brackets carrying the pivot pins 28 rearwardly and thereby induce a vertical attitude of the struts at the limit of their oscillatory range determined by the closed, forwardly-directed sides of the pockets defined by the keepers 27 and 27'. With the struts vertical in supporting relation with the elevated coach body, the latch pins 29 are inserted to secure the struts against movement relative to their respective brackets, and the vehicle is driven forwardly and from under the strut-supported body to leave the latter conditioned for desired use and optional replacement on the vehicle. Recombination of the coach body with and for translation by the vehicle is quickly and easily had through a reversal of the preceding operations; the vehicle is backed to register its bed 11 under the elevated body, the latch pins 29 are removed, a linkage is established between the strut-supported body and the truck bed, and forward travel then functions through displacement of the struts away from the vertical to lower the body to its seat in the bed, whereafter the struts may be detached or manipulated to dispositions suitable for their transport. The linkage between the coach body and truck bed requisite to apply forward travel of the vehicle for reloading of the body may be of any functionally-appropriate organization and construction, and is but typified by the showing of FIGURE 8 wherein 30 designates a bolt vertically reciprocable in a yoke 31 affixed to the forward end closure of the body portion 15. The bolt 30 is manually adjustable to and between several positions of elevation relative to the yoke 31 and is designed to engage in its lowered position forwardly of and over the forward end wall of the bed 11 from the strut-elevated coach body, and thus exemplify a linkage of the coach body to the truck bed effective to accomplish the reloading operation.

Recognizing the variable nature and conditions of the surfaces to be engaged by the struts 17 when supporting the separated coach body, it is within the contemplation of the invention that bearing shoes of substantial area may be provided on or for attachment to the lower ends of the struts, an exemplification of such being represented by FIGURE 4, wherein an angle plate 32 is arranged with one leg adapted to perpendicularly abut the free end of a strut 17 as a bearing shoe thereunder and its other leg upstanding across and against the unobstructed faces of the coplanar strut flanges 20 in any appropriate operative coaction therewith typified by inturned clips 33 fixed to the upstanding leg of the plate 32 to define thereon a slideway cooperable with said flanges.

Figure 7:
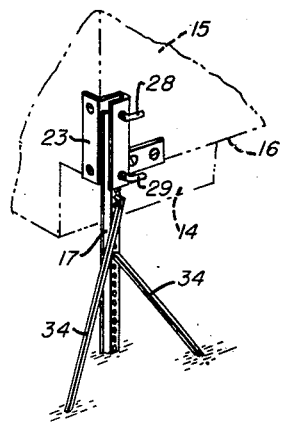
FIGURE 7 is a perspective view of one corner of the coach body in the supported arrangement according to FIGURES 2 and 3 as steadied and stabilized by typical bracing means within the contemplation of the invention, the associated portion of the coach body being represented by broken lines.

Strut-supported in detachment from the vehicle as shown and described, the coach body 13 is elevated a considerable distance above the support surface engaged by the struts 17 and may be less that adequately stable in resistance to influences tending to flex the struts, in obviation whereof it is within the scope and contemplation of the invention to provide means for bracing the several struts in their vertical, load-bearing positions, as, for example, by means of straight, rigid legs 34 hooked or studded at one end each for attachment in one of the holes 21 of the strut in divergence therefrom, as in FIGURE 7, to slight penetration of the support surface at the end of the leg remote from the strut, two of such legs diverging from the same strut at a horizontal angle of some forty-five degrees from the length of the coach body, as illustrated, affording effective security to the emplacement which they supplement.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. The combination with a coach body separably coactable in laterally-overhanging relation with an open-top, automotive vehicle bed of struts pivotally connected to corner salients of said body to swing in vertical arcs spacedly adjacent and longitudinal of the associated vehicle, said struts exceeding in length the span separating the strut pivots from the vehicle support surface when the coach body is in coacting relation with the vehicle bed, stop means automatically effective to correspondingly limit swing of said struts in one direction upon attainment of a strut disposition substantially perpendicular to the vehicle support surface, means manipulable to releasably latch said struts against displacement away from their stop-limited dispositions, and means applicable at option to link the coach body as variously correlated with the vehicle bed to and for travel with the latter, wherein said struts are straight lengths of rigid, light-weight metal characterized by a longitudinal, flat fillet interrupted by a uniformly-spaced succession or like holes, complementary flat webs divergent from the opposite long sides of said fillet, and oppositely-directed, coplanar flanges marginally of said webs spacedly paralleling the fillet.

2. The combination with a coach body separably coactable in laterally-overhanging relation with an open-top, automotive vehicle bed, said body having salient corners exposed above the bed, of a bracket affixed to overlie each said corner, a strut pivotally connected to each said bracket to swing in a vertical arc spacedly adjacent and longitudinal of the associated vehicle, said struts exceeding in length the span separating the strut pivots from the vehicle support surface when the coach body is in coacting relation with the vehicle bed, whereby said struts in dependence from the bed-mounted body will engage at their free ends against the vehicle support surface in such inclination to the vertical as will effect elevation of the body away from the bed in reaction to vehicle and body travel appropriate to vertically erect the struts, stop means carried by said brackets correspondingly engageable by and to limit unidirectional swing of the struts upon erection of the latter to vertical dispositions, means manipulable in cooperation with said brackets to releasably latch the struts against displacement away from their stop-limited dispositions, and means applicable at option to link the coach body as variously correlated with the vehicle bed to and for travel with the latter, wherein each said bracket is a rigid, angular plate unit conformed to embracingly engage exterior surface areas of the coach body intersecting at a salient corner thereof, each said bracket includes a vertical riser element fixedly carrying a keeper defining therewith a pocket for the reception of an associated strut, said pocket being vertically unobstructed, open laterally of the riser at one side and closed laterally of the riser at its other side by the connection between the bracket and keeper, and a pin spanning said pocket through the strut in detachable coaction with the bracket and keeper pivotally interconnects the strut and bracket.

3. The combination with a coach body separably coactable in laterally-overhanging relation with an open-top, automotive vehicle bed, said body having salient corners exposed above the bed, of a bracket affixed to overlie each said corner, a strut pivotally connected to each said bracket to swing in a vertical arc spacedly adjacent and longitudinal of the associated vehicle, said struts exceeding in length the span separating the strut pivots from the vehicle support surface when the coach body is in coacting relation with the vehicle bed, whereby said struts in dependence from the bed-mounted body will engage at their free ends against the vehicle support surface in such inclination to the vertical as will effect elevation of the body away from the bed in reaction to vehicle and body travel appropriate to vertically erect the struts, stop means carried by said brackets correspondingly engageable by and to limit unidirectional swing of the struts upon erection of the latter to vertical dispositions, means manipulable in cooperation with said brackets to releasably latch the struts against displacement away from their stop-limited dispositions, and means applicable at option to link the coach body as variously correlated with the vehicle bed to and for travel with the latter, wherein each said bracket is a rigid, angular plate unit conformed to embracingly engage exterior surface areas of the coach body intersecting at a salient corner thereof, each said bracket includes a vertical riser element fixedly carrying a keeper defining therewith a pocket for the reception of an associated strut, the so-constituted pockets of all of the brackets being alike vertically unobstructed, open laterally of the associated riser at one side in the same direction longitudinally of the coach body and closed laterally of the associated riser at the other side by the connection between the bracket and keeper, and a pin spanning each said pocket through the associated strut in detachable coaction with the bracket and keeper pivotally connects each strut to its bracket to swing in correspondence with its counterparts relative to the stop means presented by the closed side of its pocket.

4. The combination with a coach body separably co-actable in laterally-overhanging relative with on open-top, automotive vehicle bed, said body having salient corners exposed above the bed, of a bracket affixed to overlie each said corner, a strut pivotally connected to each said bracket to swing in a vertical arc spacedly adjacent and longitudinal of the associated vehicle, said struts exceeding in length the span separating the strut pivots from the vehicle support surface when the coach body is in coacting relation with the vehicle bed, whereby said struts in dependence from the bed-mounted body will engage at their free ends against the vehicle support surface in such inclination to the vertical as will effect elevation of the body away from the bed in reaction to vehicle and body travel appropriate to vertically erect the struts, stop means carried by said brackets correspondingly engageable by and to limit unidirectional swing of the struts upon erection of the latter to vertical dispositions, means manipulable in cooperation with said brackets to releasably latch the struts against displacement away from their stop-limited dispositions, and means applicable at option to link the coach body as variously correlated with the vehicle bed to and for travel with the latter, wherein each said bracket includes a vertical riser element fixedly carrying a keeper defining therewith a vertically-unobstructed pocket open at one side laterally of the riser and closed at its other side adapted to receive an associated strut, a pin spanning said pocket through the strut in detachable coaction with the bracket and keeper pivotally interconnects the strut and bracket to qualify the closed side of the pocket as stop means effective to limit swing of the strut in one direction, and the means for releasably latching the strut in its stop-limited disposition is a second pin detachably coactable with the bracket and keeper to span the pocket therebetween through the strut in spaced parallelism with said first pin.

5. The combination with a coach body separably co-actable in laterally-overhanging relation with an open-top, automotive vehicle bed, said body having salient corners exposed above the bed, of a bracket affixed to overlie each said corner, a strut pivotally connected to each said bracket to swing in a vertical arc spacedly adjacent and longitudinal of the associated vehicle, said struts exceeding in length the span separating the strut pivots from the vehicle support surface when the coach body is in coacting relation with the vehicle bed, whereby said struts in dependence from the bed-mounted body will engage at their free ends against the vehicle support surface in such inclination to the vertical as will effect elevation of the body away from the bed in reaction to vehicle and body travel appropriate to vertically erect the struts, stop means carried by said brackets correspondingly engageable by and to limit unidirectional swing of the struts upon erection of the latter to vertical dispositions, means manipulable in cooperation with said brackets to releasably latch the struts against displacement away from their stop-limited dispositions, and means applicable at option to link the coach body as variously correlated with the vehicle bed to and for travel with the latter, wherein each said bracket includes a vertical riser element fixedly carrying a keeper defining therewith a vertically-unobstructed pocket open at one side laterally of the riser and closed at its other side adapted to receive an associated strut, said struts are formed with a longitudinally- and uniformly-spaced succession of like holes, a pin spanning said pocket through one of the holes in the strut in detachable coaction with the bracket and keeper pivotally interconnects the strut and bracket to qualify the closed side of the pocket as stop means effective to limit swing of the strut in one direction, and the means for releasably latching the strut in its stop-limited disposition is a second pin detachably coactable with the bracket and keeper to span the pocket therebetween through another of the holes in the strut in spaced parallelism with said first pin.

References Cited in the file of this patent
UNITED STATES PATENTS

| | | |
|---|---|---|
| 416,519 | Troxell | Dec. 3, 1889 |
| 2,775,355 | Leitner et al. | Dec. 25, 1956 |
| 2,812,873 | Coleman | Nov. 12, 1957 |
| 2,868,401 | Lelois | Jan. 13, 1959 |
| 2,891,748 | Winegard | Jan. 23, 1959 |
| 2,925,930 | Parks | Feb. 23, 1960 |
| 2,980,376 | Westerfield | Apr. 18, 1961 |
| 3,074,576 | Peterson | Jan. 22, 1963 |

FOREIGN PATENTS

| | | |
|---|---|---|
| 696,728 | Great Britain | Sept. 9, 1953 |